United States Patent
Joshi et al.

(10) Patent No.: US 6,895,121 B2
(45) Date of Patent: May 17, 2005

(54) METHOD FOR UTILIZING SUBJECT CONTENT ANALYSIS FOR PRODUCING A COMPRESSED BIT STREAM FROM A DIGITAL IMAGE

(75) Inventors: Rajan L. Joshi, Rochester, NY (US); Jiebo Luo, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 495 days.

(21) Appl. No.: 09/898,230

(22) Filed: Jul. 3, 2001

(65) Prior Publication Data

US 2003/0044078 A1 Mar. 6, 2003

(51) Int. Cl.[7] .................................................. G06K 9/36
(52) U.S. Cl. ........................................................ 382/243
(58) Field of Search ................................ 382/232, 243, 382/234–236, 238–240, 247–248, 250–251; 348/384.1, 398.1, 399.1; 375/240.01, 240.11, 240.24; 708/203

(56) References Cited

U.S. PATENT DOCUMENTS 6,282,317 B1 * 8/2001 Luo et al. .................... 382/203

FOREIGN PATENT DOCUMENTS

EP          1 017 019 A      7/2000

OTHER PUBLICATIONS

"High Performance Scalable Compression with EBCOT", by D. Taubman, IEEE Transactions on Image Processing, 9(7), Jul. 2000, pp. 1158–1170.

"Efficient Region of Interest Encoding Techniques in the Upcoming JPEG2000 Still Image Coding Standard", by C. Christopoulos, J. Askelof, and M. Larsson, IEEE International Conference on Image Processing, Sep. 2000, Vancouver, Canada.

"Wavelet Transform that Maps Integers to Integers" by R. Calderbank, I. Daubechies, W. Sweldens, and B.L. Yeo. Applied and Computational Harmonic Analysis, vol. 5, No. 3, 1998, pp. 332–369.

"Efficient Bit Allocation for an Arbitrary Set of Quantizers" by Y. Shoham and A. Gersho. IEEE Transactions on Acoustics, Speech, and Signal Processing, 36(9), Sep. 1988, pp. 1445–1453.

(Continued)

Primary Examiner—Jose L. Couso
(74) Attorney, Agent, or Firm—David M. Woods (57) ABSTRACT

A method for producing a compressed bit-stream from a digital image includes the steps of a) processing the digital image to produce a main subject belief map containing a continuum of belief values relating to the importance of subject and background regions in the image, b) performing a spatio-frequency transformation on the digital image to produce an array of transform coefficients, c) deriving a distortion-weighting factor for each transform coefficient from the belief map, and d) producing a compressed bit stream using an image compression system that is responsive to the distortion-weighting factors. The specific image compression system may be selected from a variety of image compression systems, including JPEG compression, JPEG2000 compression or vector quantization. The production of the main subject belief map involves the extraction of at least one structural saliency feature and at least one semantic saliency feature from the image, and the integration of the structural saliency feature and the semantic feature using a probabilistic reasoning engine into an estimate of a belief that a region of the digital image is the main subject.

40 Claims, 5 Drawing Sheets

OTHER PUBLICATIONS

"Color Image Quantization based on Physics and Psychophysics" by Lee, Journal of Society of Photographic Science and Technology of Japan, vol. 59, No. 1, 1996, pp. 212–225.

U.S. patent application Ser. No. 09/223,860, Jiebo et al., filed Dec. 31, 1998.

"JPEG 2000 Part I Final Commitee Draft Version 1.0", ISO/IEC JTC1/SC29/WG1 N1646, Mar. 16, 2000, pp. A,B, I–XII, 1, XP001004858.

Taubman D: "High Performance Scalable Image Compression With EBCOT", IEEE Transactions on Image Processing, IEEE Inc., New York, US, vol. 9, No. 7, Jul. 2000, pp. 1158–1170, XP000951990, ISSN: 1057–7149.

Singhal A. et al: "A Multilevel Bayesian Network Approach to Image Sensor Fusion", Proceedings of the Third International Conference on Information Fusion, Paris, vol. 2, Jul. 10, 2000, pp. 9–16, XP010505068.

Luo H. et al: "Statistical Model Based Video Segmentation and Its Application to Very Low Bit Rate Video Coding", Image Processing, 1998, ICIP 98. Proceedings. 1998 International Conference on Chicago, IL., USA, Oct. 4–7, 1998, Los Alamitos, CA, USA, IEEE Comput. Soc., US, Oct. 4, 1998, pp. 438–442, XP010586785, ISBN: 0–8186–8821–1.

Cziho A. et al: "Medical Image Compression Using Region–of–Interest Vector Quantization", Engineering in Medicine and Biology Society, 1998. Proceedings of the $20^{th}$ Annual International Conference of the IEEE Hong Kong, China Oct. 29–Nov. 1, 1998, Piscataway, NJ, USA, IEEE, US, Oct. 29, 1998, pp. 1277–1280, XP010320291 ISBN: 0–7803–5164–9.

* cited by examiner

METHOD FOR UTILIZING SUBJECT CONTENT ANALYSIS FOR PRODUCING A COMPRESSED BIT STREAM FROM A DIGITAL IMAGE

FIELD OF THE INVENTION

The invention relates to a method for spatially adaptive quantization in a lossy image compression system. More specifically, it relates to a method for adapting the extent of quantization for different spatio-frequency regions of an image based on subject content analysis. When trying to achieve a specific bit rate or compression ratio, this has the effect of maximizing the visual quality of regions that are likely to be important for the reconstructed image quality as perceived by the end-user.

BACKGROUND OF THE INVENTION

In recent years, many methods for subband or wavelet compression of images have been proposed. One such method is the EBCOT algorithm as described in D. Taubman, "High performance scalable compression with EBCOT," IEEE Transactions on Image Processing, 9(7), pp. 1158–1170 (July 2000). The emerging JPEG2000 image compression standard, as described in Information Technology—JPEG2000 Image Coding System, ISO/IEC International Standard 15444-1, ITU Recommendation T.800, is based on the EBCOT algorithm.

The EBCOT algorithm decomposes the image using a wavelet transform. The resulting subbands are further divided into smaller codeblocks. The codeblocks are quantized and entropy coded independently. The EBCOT algorithm uses two different methods to allocate bits to different codeblocks. In one method, the mean squared error (MSE), possibly weighted, is estimated assuming that the compressed bit-stream is truncated at each potential truncation point. Then, a truncation point is chosen for each codeblock after analyzing the rate-distortion trade-off. In another method, the MSE is adjusted by a factor that accounts for the visibility of quantization noise at a particular spatio-frequency location, based on the visual masking property of the human visual system (HVS).

The prior art mentioned above is limited to rate-distortion trade-offs in different spatio-frequency regions according to low-level visual characteristics. There is also a need to perform such trade-off based on the semantic meaning of the objects in an image. It is desirable to allocate more bits to regions of interest (ROIs) or foreground regions for relatively higher quality in such regions, while allocating fewer bits to the background regions. This maximizes the visual quality of regions that are likely to be important for the reconstructed image quality as perceived by the end-user. Conventionally, the ROI is specified using a binary mask as described in C. Christopoulos, J. Askelof and M. Larsson, "Efficient regions of interest encoding techniques in the upcoming JPEG2000 still image coding standard," IEEE International Conference on Image Processing, September 2000, Vancouver, Canada. A drawback of using a binary ROI mask is that the result is extremely sensitive to the correctness and accuracy of the binary mask; and there is no known robust automatic method for generating an accurate binary mask.

SUMMARY OF THE INVENTION

The present invention is directed to overcoming one or more of the problems set forth above. Briefly summarized, according to one aspect of the present invention, a method for producing a compressed bit-stream from a digital image includes the steps of a) processing the digital image to produce a main subject belief map containing a continuum of belief values relating to the importance of subject and background regions in the image; b) performing a spatio-frequency transformation on the digital image to produce an array of transform coefficients; c) deriving a distortion-weighting factor for each transform coefficient from the belief map; and d) producing a compressed bit stream using an image compression system that is responsive to the distortion-weighting factors.

The specific image compression system may be selected from a variety of image compression systems, including JPEG compression, JPEG2000 compression or vector quantization. In the case of vector quantization, the spatio-frequency transformation is an identify transform. The production of the main subject belief map in step a) involves the extraction of regions of homogeneous properties from the digital image, the extraction for each of the regions of at least one structural saliency feature and at least one semantic saliency feature, and the integration of the structural saliency feature and the semantic feature using a probabilistic reasoning engine into an estimate of a belief that each region is the main subject.

In a specific implementation with regard to a subband decomposition, such as a wavelet decomposition, the method includes the steps of a) processing the digital image to produce a main subject belief map containing a continuum of belief values relating to the importance of subject and background regions in the image; b) performing subband decomposition on the digital image using analysis filters to produce an array of subband coefficients that can be used to reconstruct the digital image by summing corresponding synthesis basis functions weighted by the subband coefficients; c) deriving a distortion-weighting factor from the belief map for each subband coefficient; and d) producing a compressed bit stream not exceeding a target size from the subband coefficients using the distortion-weighting factors to minimize an error function.

The advantage of the invention is that, while achieving a specific bit rate or compression ratio, it has the effect of maximizing the visual quality of regions that are likely to be important for the reconstructed image quality as perceived by the end-user.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIGS. 5-(a) and 5-(b) show graphs of the decision thresholds and reconstruction levels for step-sizes of $\Delta$ and $2\Delta$, respectively, for a uniform dead-zone scalar quantizer.

DETAILED DESCRIPTION OF THE INVENTION

A preferred embodiment of the present invention is a lossy image encoder based on the proposed JPEG2000 image compression standard. Because the proposed JPEG2000 image compression standard specifies how the decoder shall interpret a compressed bit-stream, there are certain inherent restrictions on any JPEG2000 encoder. For example, in Part I of the JPEG2000 standard, only certain wavelet filters can be used. The entropy coder is also fixed. These methods are described in *Information Technology—JPEG2000 Image Coding System, ISO/IEC International Standard* 15444-1, *ITU Recommendation T.*800. Hence, the present description will be directed in particular to attributes forming part of, or cooperating more directly with, the algorithm in accordance with the present invention. Attributes not specifically shown or described herein may be selected from those described in *Information Technology—JPEG2000 Image Coding System, ISO/IEC International Standard* 15444-1, *ITU Recommendation T.*800, or otherwise known in the art. Although a preferred embodiment uses the JPEG2000 compression algorithm, in which the spatio-frequency transformation is a subband decomposition (specifically, a wavelet decomposition), the invention can be applied to other lossy compression systems which use other spatio-frequency transformations, such as other spatio-frequency decompositions, block-based transformations and block-based vector quantization, in which the spatio-frequency transformation is an identity transform.

In the following description, a preferred embodiment of the present invention would ordinarily be implemented as a software program, although those skilled in the art will readily recognize that the equivalent of such software may also be constructed in hardware. Given the system and methodology as described in the following materials, all such software implementation needed for practice of the invention is conventional and within the ordinary skill in such arts. If the invention is implemented as a computer program, the program may be stored in conventional computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Reference will now be made in detail to the present preferred embodiment of the invention, an example of which is illustrated in the accompanying drawings. While the invention will be described in connection with a preferred embodiment, it will be understood that it is not intended to limit the invention to that embodiment. On the contrary, it is intended to cover all alternatives, modifications, and equivalents as may be included within the spirit and scope of the invention defined in the appended claims.

Figure 1:
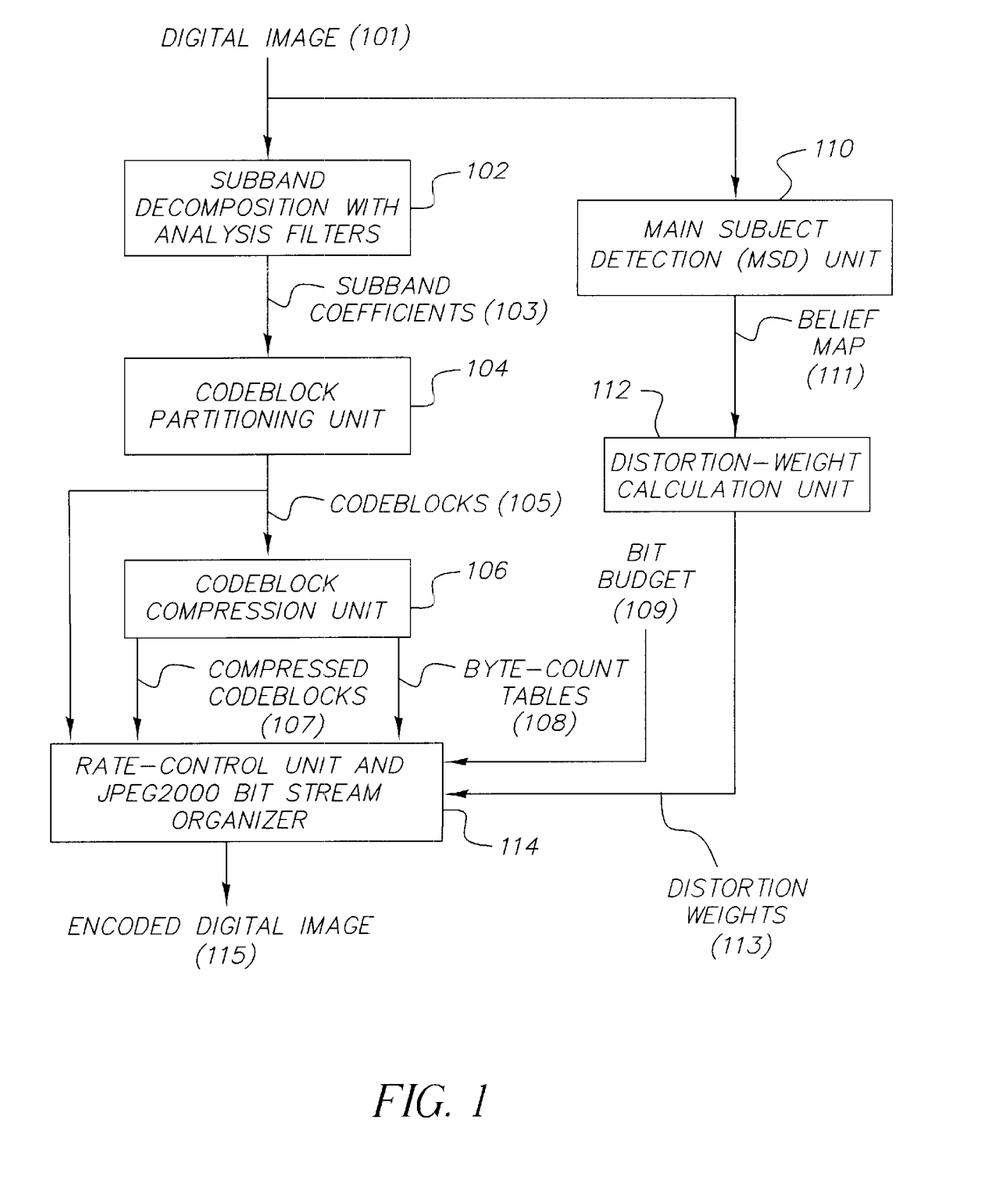
FIG. 1 is a block diagram of a JPEG2000 encoder according to the present invention.

A flow chart of a JPEG2000 image encoder according to the present invention is shown in FIG. 1. A digital image (101) undergoes subband decomposition (102) by the analysis filters to produce an image representation in terms of subband coefficients (103). If the image has multiple components (e.g. RGB), a luminance-chrominance transformation may be applied to convert it to a YCbCr representation, before the subband decomposition step (102). Also, it is possible to divide each component of the image into a number of tiles. But in this preferred embodiment, only a single tile consisting of the entire image is used. Even though the preferred embodiment uses subband decomposition, other space-frequency decompositions are also possible. The subband coefficients (103) are partitioned into one or more rectangular blocks by the codeblock partitioning unit (104) to produce one or more codeblocks (105). Each codeblock is compressed by the codeblock compression unit (106) using the appropriate quantizer step-size to produce a compressed codeblock bit-stream (107) and a byte-count table (108). The digital image (101) is also input to a main subject detection (MSD) unit (110). The MSD unit analyzes the input digital image to produce a belief map (111). The distortion-weight calculation unit (112) uses the belief map (111) to derive the distortion-weights (113) that are used by the rate-control algorithm. The codeblocks (105), compressed codeblocks (107), byte-count tables (108), a bit budget (109), and distortion-weights (113) are input to the rate-control unit and JPEG2000 bit-stream organizer (114), which produces the encoded digital image (115).

Figure 2:
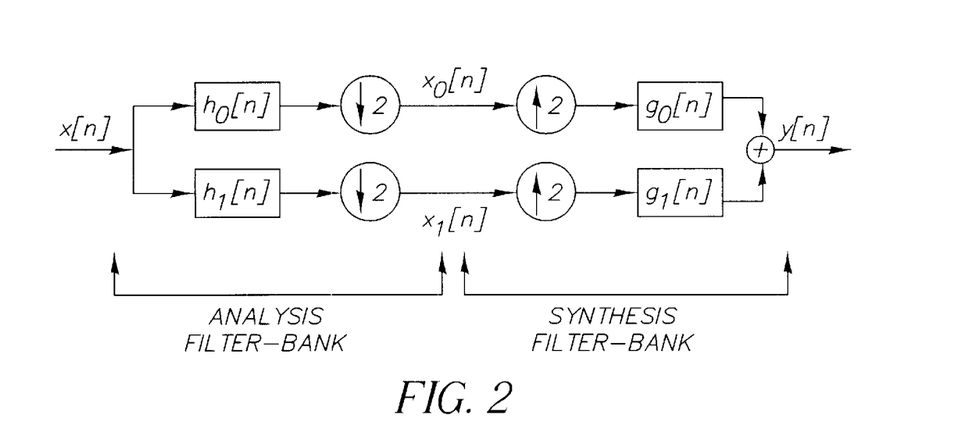
FIG. 2 shows a two-band filter-bank for a 1-D signal.

The blocks in FIG. 1 will now be described in greater detail. The JPEG2000 encoder uses a wavelet decomposition, which is a special case of a subband decomposition (102). FIG. 2 shows a two-band filter-bank for a one-dimensional signal. The input signal $x[n]$ is first filtered by the two analysis filters, $h_0[n]$ and $h_1[n]$. The filters, $h_0$ and $h_1$, are typically low-pass and high-pass, respectively. The outputs of the filters are downsampled by 2 to produce subband signals, $x_0[n]$ and $x_1[n]$. When a signal is downsampled by 2, every alternate sample (odd sample) is discarded. The operations of filtering and downsampling, together, constitute the analysis filter-bank. The samples of a subband signal are referred to as subband coefficients. In a subband coding system, the subband signals are quantized. But we will ignore the quantization operation for the moment. On the synthesis side, the subband signals are upsampled by 2. This means that a zero is inserted between every two samples of a subband. Then, the upsampled signals are passed through the synthesis filters, $g_0[n]$ and $g_1[n]$, and combined to produce the output signal $y[n]$. A filter-bank is said to have perfect reconstruction property if in the absence of quantization, $y[n]=x[n]$.

Figure 3:
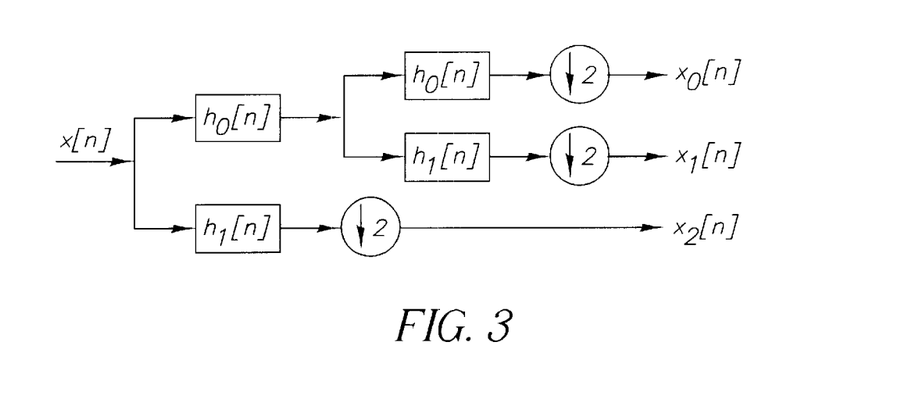
FIG. 3 shows a two-level octave decomposition.

In an octave decomposition, the subband produced by low-pass filtering, $x_0[n]$, is split recursively. FIG. 3 shows an example of a 2 level octave decomposition, producing subbands $x_0[n]$, $x_1[n]$, and $x_2[n]$. In this case the subbands have been numbered from the lowest frequency to the highest frequency. The number of decomposition levels indicates the number of times the low-pass subband is split. A wavelet decomposition is an octave decomposition in which the analysis and synthesis filters satisfy certain regularity properties as described in G. Strang and T. Nguyen, *Wavelets and filter banks*, Wellesley-Cambridge Press (1997).

The above two-band filter-bank for a one-dimensional signal can be easily extended to two dimensions. One possible way to achieve this is to apply the two-band filter-bank successively along row and column directions of a two-dimensional signal. This is known as a separable two-dimensional filter-bank. In this case, one level of subband decomposition produces 4 subbands. JPEG2000 only allows separable decompositions.

In a perfect reconstruction filter-bank system, each subband coefficient can be associated with a synthesis basis function. The basis functions for subband coefficients in the same band are shifted versions of each other. Basis functions from different bands having the same orientation are related by spatial dilation property as described in G. Strang and T. Nguyen, *Wavelets and filter banks*, Wellesley-Cambridge Press (1997). The input signal x[n] can be expressed as a linear combination of the synthesis basis functions. Let $\Psi_m^i[n]$ denote the basis function for coefficient $x_i[m]$, the $m^{th}$ coefficient from subband i. Then, $$x[n] = \sum_i \sum_m x_i[m] \Psi_m^i[n]. \quad (1)$$

The simplest way to determine the basis functions is as follows. For determining the basis function for coefficient $x_i[m]$, the coefficient value is set to one, and all other coefficients from that subband as well as other subbands are set to zero. Then, the image reconstructed by synthesizing the subbands is the basis function $\Psi_m^i[n]$ corresponding to subband coefficient $x_i[m]$. Since the basis functions for other coefficients from the same band are shifted versions of $\Psi_m^i[n]$, this calculation needs to be done only once for each subband. In two dimensions, let the original image be represented as I(u,v), where u and v represent the row index and column index, respectively. Then, $$I(u, v) = \sum_i \sum_{g,h} x_i(g, h) \Psi_{gh}^i(u, v), \quad (2)$$

where $x_i(g,h)$ refers to the subband coefficient from subband i, with g and h referring to the row and column index of that coefficient, respectively.

The region of support of a basis function is defined as all the pixels for which the basis function has a non-zero value. For a two-dimensional separable filter-bank, the region of support for a basis function is guaranteed to be rectangular. Thus, the region of support in the row and column direction can be determined separately. The Cartesian product of the two regions of supports is the region of support for the two-dimensional basis function.

Figure 4:
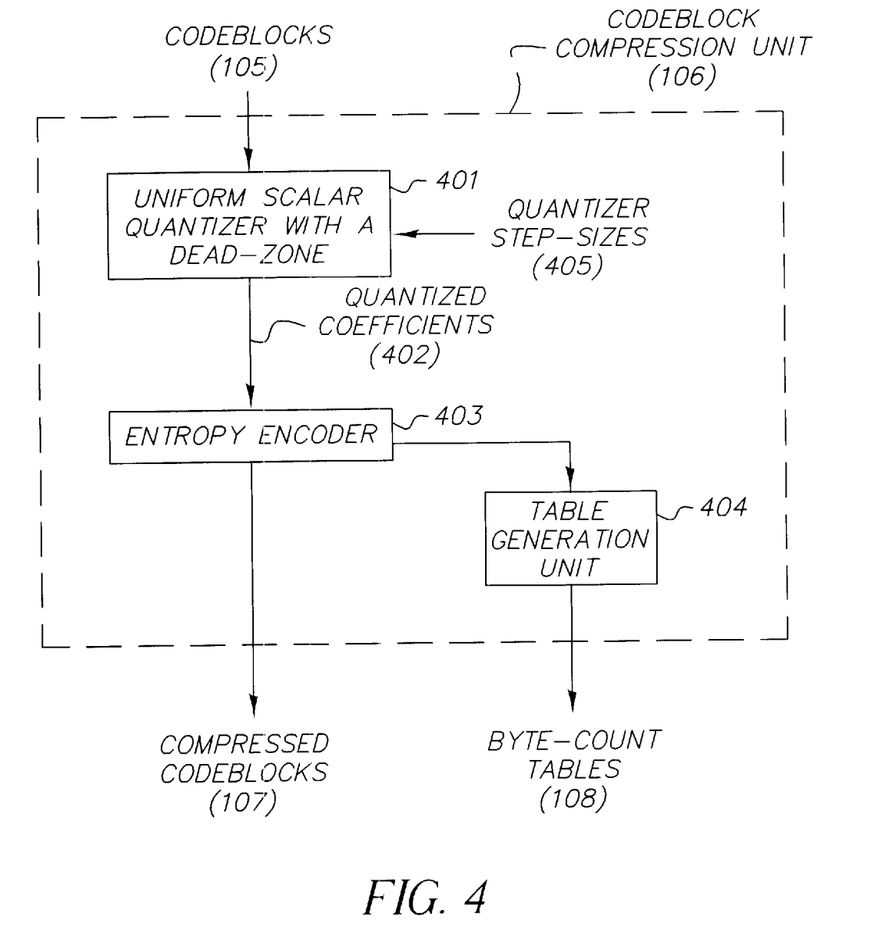
FIG. 4 shows a block diagram of the codeblock compression unit.
Figure 5A:
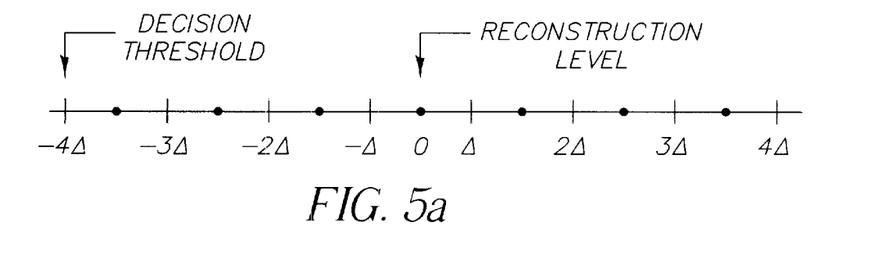
Figure 5B:
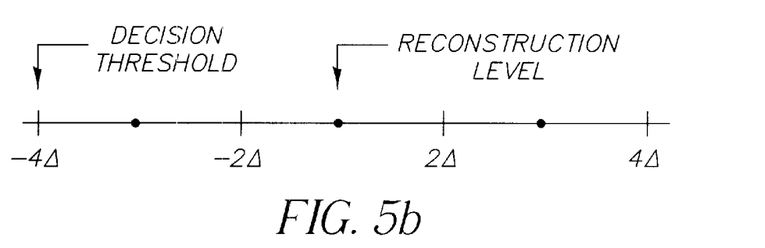

The codeblock partitioning unit (104) partitions each subband into one or more rectangular codeblocks. The codeblock compression unit (106) is shown in greater detail in FIG. 4. Each codeblock is quantized with a scalar quantizer (401) using the appropriate quantizer step-size (405) to produce a sign-magnitude representation of the indices of the quantized coefficients (402). We use a uniform scalar quantizer with a dead-zone. The decision thresholds and reconstruction levels for this quantizer are shown in FIGS. 5-(*a*) and 5-(*b*) for step-sizes of Δ and 2Δ, respectively. In a preferred embodiment, the reconstruction levels are always at the center of the quantization interval. But those skilled in the art will recognize that this is not necessary. For example, the reconstruction levels can be biased towards zero. The same base quantizer step-size is used for all the codeblocks in a given subband. Let the step-size for subband i be $\Delta_i$. If the subband analysis and synthesis filters are reversible (R. Calderbank, I. Daubechies, W. Sweldens, and B.-L. Yeo, "Wavelet Transform that Maps Integers to Integers," *Applied and Computational Harmonic Analysis*, vol. 5, no. 3, pp. 332–369, 1998), the quantization step may be entirely absent. Quantized wavelet coefficients from each codeblock are independently encoded by an entropy coder (403). The entropy coder (403) encodes the sign-magnitude representation of the codeblock coefficients as bit-planes. Suppose that the codeblock being processed is from subband i. Then, the samples from the codeblock are quantized with a uniform dead-zone scalar quantizer with step-size $\Delta_i$ as described above. Suppose that the magnitude of the indices of quantized coefficients in subband i is represented by a fixed precision of $A_i$ bits. Let the bits be indexed as 1,2, . . . , $A_i$, where index 1 corresponds to the most significant bit (MSB) and $A_i$ corresponds to the least significant bit (LSB). The $k^{th}$ bit-plane for the codeblock consists of the $k^{th}$ bit from the magnitude representation of all the indices of quantized coefficients from that codeblock. For the purpose of entropy coding, a bit-plane for a codeblock is said to be significant if any of the previous bit-planes were significant or the bit-plane has at least one non-zero bit. Similarly, proceeding from the most significant to the least significant bit, a quantized coefficient is said to have become significant when the first non-zero bit is encountered.

The entropy encoder codes each bit-plane for the codeblock in one or more coding passes. For example, the most significant bit-plane is encoded using a single coding pass, known as the cleanup pass. The rest of the bit-planes for the codeblock are encoded using three coding passes, namely, significance propagation pass, magnitude refinement pass, and cleanup pass, in that order. Let us assume that $k^{th}$ bit-plane of a codeblock is being encoded. Then, in each pass, the $k^{th}$ bits of some quantized coefficients from that codeblock are encoded. The coding pass in which the $k^{th}$ bit of a particular coefficient gets encoded depends on the significance of that coefficient and that of other coefficients in the neighborhood. If the magnitude representation of quantized codeblock coefficients has $A_i$ bit-planes, the total number of coding passes necessary to encode all the bit-planes is (3*($A_i$−1)+1). The table generation unit (404) generates a byte-count table (108) for each codeblock. The $p^{th}$ entry in the table corresponds to the number of bytes needed to include the first p coding passes from that codeblock in the compressed bit-stream.

The rate-control algorithm used by the EBCOT algorithm, as described in D. Taubman, "High performance scalable compression with EBCOT," *IEEE Transactions on Image Processing*, 9(7), pp. 1158–1170 (July 2000), is as follows. Let the total number of codeblocks for the entire image be P. Let the codeblocks be denoted by $B_s$, $1 \leq s \leq P$. Initially, each codeblock is quantized using a very fine quantizer step-size and entropy-coded independently to generate a compressed bit-stream. Let the compressed bit-stream corresponding to codeblock $B_s$ be denoted by $C_s$. Typically, for each codeblock, the compressed data included in the final bit-stream is a truncated version of the initial compressed bit-stream. The potential truncation points for compressed bit-stream $C_s$ are nominally the boundaries of the coding passes. Let the possible truncation points for codeblock $B_s$ be denoted by $T_s^z$, $1 \leq z \leq N_s$, where $N_s$ denotes the number of possible truncation points for the compressed bit-stream $C_s$. Let the size of the truncated bit-stream corresponding to truncation point $T_s^z$ be $R_s^z$ bytes. With each truncation point $T_s^z$, we can also associate a distortion $D_s^z$. The distortion quantifies the error between the original image and the reconstructed image, if the compressed codeblock is truncated after $R_s^z$ bytes. In general, if the distortion measure is weighted mean squared error (MSE), the distortion can be specified as $$D_s^z = \|\varphi_i\|^2 \sum_{(g,h)} w_i(g, h)(\hat{x}_i^z(g, h) - x_i(g, h))^2, \quad (3)$$

where the summation is over all coefficients in codeblock $B_s$. The original codeblock coefficients are denoted by $x_i(g,h)$. Here we have assumed that block $B_s$ is from subband i. $\hat{x}_i^z(g,h)$ refers to codeblock coefficients reconstructed from the first $R_s^z$ bytes of the compressed bit-stream $C_s$. $\|\phi_i\|$ is the $L_2$ norm of the basis function associated with any coefficient from subband i. It should be noted that all the coefficients from a single subband have the same $L_2$ norm.

The squared error for coefficient $x_i(g,h)$ is weighted by the distortion-weighting factor $w_i(g,h)$. The distortion-weighting factor may represent the visibility of the quantization noise at that location due to visual masking as described in D. Taubman, "High performance scalable compression with EBCOT," *IEEE Transactions on Image Processing*, 9(7), pp. 1158–1170 (July 2000). Under certain assumptions, the distortions from different codeblocks are additive. Thus, given a bit-budget (109) of $R_T$ bytes, the rate-control problem can be specified as finding optimal truncation points $t_s^*$, $1 \leq s \leq P$ such that the total distortion, $$D = \sum_s D_s(t_s^*), \text{ is minimized subject to } \sum_s R_s(t_s^*) \leq R_T.$$

Here we have abused the notation to show that both the rate and distortion for a codeblock depend on the chosen truncation point. It should be noted that choosing different truncation points for different codeblocks results in spatially adaptive quantization. The above problem is a well-known constrained optimization problem. To solve this problem, the knowledge of the operational rate-distortion curve for each codeblock is necessary. This means that the encoder needs to keep track of the rate and distortion corresponding to each possible truncation point for each codeblock. The size of the compressed bit-stream corresponding to different truncation points for a codeblock is already available via the byte-count table (108) generated by the codeblock compression unit. The solution to the above rate-control problem is described in Y. Shoham and A. Gersho, "Efficient bit allocation for an arbitrary set of quantizers," *IEEE Transactions on Acoustics, Speech, and Signal Processing*, 36(9), pp. 1445–1453, (September 1988).

Figure 6:
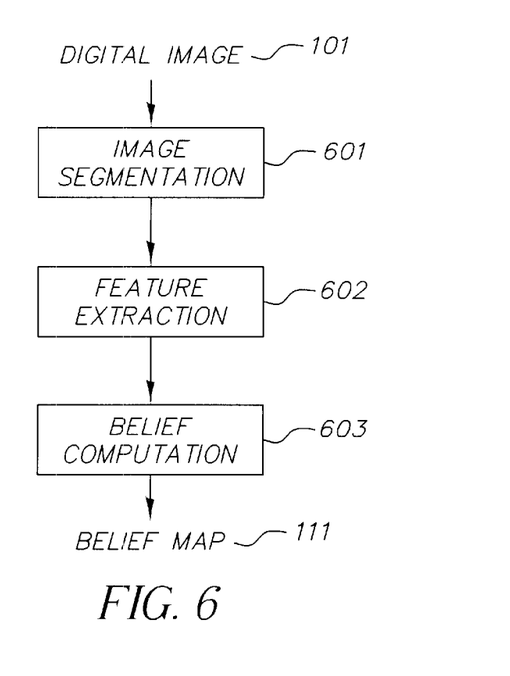
FIG. 6 shows a block diagram of the main subject detection (MSD) unit.

In a preferred embodiment of the invention, the distortion-weighting factor for each subband coefficient is calculated using the semantic meaning of the input image. FIG. 6 shows a flow diagram of the main subject detection (MSD) unit (110). The MSD unit (110) assigns belief values to pixels in an image. The digital image (101) is input to the image segmentation unit (601). The image is first segmented into homogenous regions by analysis of the color or texture of each region. The feature extraction unit (602) extracts useful features, which may include structural or semantic features of the image. The belief computation unit (603) assigns belief values to pixels based, in part, on the extracted feature information. The same belief value is assigned to all pixels within each region. The resultant information is compiled into a belief map (111) for the image. The belief map therefore contains data in the belief value for all pixels in the image on a region by region basis as well as data on the location of each region.

The matter of main subject detection has been developed and is the subject matter of a co-pending patent application assigned to the assignee of the present invention. The system of main subject detection in a consumer-type photographic image from the perspective of a third-party observer has been developed and is described in commonly assigned U.S. patent application Ser. No. 09/223,860, entitled "Method for Automatic Determination of Main Subjects in Consumer Images" and filed Dec. 31, 1998 in the names of J. Luo, S. Etz and A. Singhal. The contents of U.S. patent application Ser. No. 09/223,860 are hereby incorporated by reference into the present application.

Main subject detection provides a measure of saliency or relative importance for different regions that are associated with different subjects in an image. This is the aforementioned continuum of belief values assigned to pixels in an image. Conventional wisdom in the field of computer vision, which reflects how a human observer would perform such tasks as main subject detection and cropping, calls for a problem-solving path via object recognition and scene content determination according to the semantic meaning of recognized objects.

With respect to the present invention and the aforementioned U.S. patent application Ser. No. 09/223,860, the main subject detection system is built upon mostly low-level vision features with semantic information integrated whenever available. This main subject detection system has a number of sub-tasks, including region segmentation, perceptual grouping, feature extraction, and probabilistic reasoning. In particular, a large number of features are extracted for each segmented region in the image to represent a wide variety of visual saliency properties, which are then input into a tunable, extensible probability network to generate a belief map containing a continuum of values.

Using main subject detection, regions that belong to the main subject are generally differentiated from the background clutter in the image. Thus, selective emphasis of main subjects or de-emphasis of background becomes possible. Automatic subject emphasis is a nontrivial operation that was considered impossible for unconstrained images, which do not necessarily contain uniform background, without a certain amount of scene understanding. In the absence of content-driven subject emphasis, conventional systems rely on a manually created mask to outline where the main subject is. This manual procedure is laborious and has been used in movie production studios. However, it is not feasible to use a manual procedure for commercial mass photo finishing for consumers.

Again, referring to FIG. 6, an input image is segmented into a few regions of homogeneous properties, such as color and texture. The regions are evaluated for their saliency in terms of two independent but complementary feature types, structural features and semantic features. For example, recognition of human skin or faces is semantic while determination of what stands out generically is categorized as structural. Respecting structural features, a set of low-level vision features and a set of geometric features are extracted. Respecting semantic features, key subject matter frequently seen in photographic pictures are detected. The evidences from both types of features are integrated using a Bayes net-based reasoning engine to yield the final belief map of the main subject. For reference on Bayes nets, see J. Pearl, *Probabilistic Reasoning in Intelligent Systems*, Morgan Kaufmann, San Francisco, Calif., 1988, the contents of which are hereby incorporated by reference thereto.

One structural feature is centrality. In terms of location, the main subject tends to be located near the center instead of the periphery of the image, therefore, a high degree of centrality is indicative that a region is a main subject of an image. However, centrality does not necessarily mean a region is directly in the center of the image. In fact, professional photographers tend to position the main subject along lines and intersections of lines that divide an image into thirds, the so called gold-partition positions or rule of thirds.

It should be understood that the centroid of the region alone may not be sufficient to indicate the location of a region with respect to the entire image without any indication of its size and shape of the region. The centrality measure is defined by computing the integral of a probability density function (PDF) over the area of a given region. The PDF is derived from the "ground truth" data, in which the main subject regions are manually outlined and marked by a value of one and the background regions are marked by a value of zero, by summing the ground truth maps over an entire training set. In essence, the PDF represents the distribution of main subjects in terms of location. The centrality measure is devised such that every pixel of a given region, not just the centroid, contributes to the centrality measure of the region to a varying degree depending on its location. The centrality measure is defined as:

$$\text{centrality} = \frac{1}{N_R} \sum_{(x,y) \in R} PDF_{\text{MSD\_Location}}(x, y)$$

where (x,y) denotes a pixel in the region R, $N_R$ is the number of pixels in region R.

If the orientation is unknown, the PDF is symmetric about the center of the image in both vertical and horizontal directions, which results in an orientation-independent centrality measure. If the orientation is known, the PDF is symmetric about the center of the image in the horizontal direction but not in the vertical direction, which results in an orientation-dependent centrality measure.

Another structural feature is borderness. Many background regions tend to contact one or more of the image borders. Therefore, a region that has significant amount of its contour on the image borders is more likely to belong to the background then to the main subject. Two measures are used to characterize the borderness of a region. They include the number of image borders that a region intersects (hereinafter "borderness$_1$") and the percentage of a region's perimeter along the image borders (hereinafter "borderness$_2$").

When orientation is unknown, borderness$_1$ is used to place a given region into one of six categories. This is determined by the number and configuration of image borders that the region is in contact with. A region is in contact with a border when at least one pixel in the region falls within a fixed distance of the border of the image. Distance is expressed as a fraction of the shorter dimension of the image. The six categories for borderness$_1$ are: none, one border, two borders, two facing borders, three or four borders that the region contacts. The more contact a region has with a border increases the likelihood that the region is not a main subject.

If the image orientation is known, the borderness feature can be redefined to account for the fact that a region that is in contact with the top border is much more likely to be background than a region that is in contact with the bottom border. This results in twelve categories for borderness$_1$ determined by the number and configuration of image borders that the region is in contact with. Using the definition of "in contact with" from above, the four borders of the image are labeled as "Top", "Bottom", "Left", and "Right" according to their position when the image is oriented with objects in the scene standing upright.

The second borderness features, borderness$_2$, is defined as the fraction of the region perimeter that is on the image border. This fraction, intrinsically, cannot exceed one-half, because to do so would mean the region has a negative area, or a portion of the region exists outside the image area, which would be unknown for any arbitrary image. Since such a fraction cannot exceed one-half, the following definition is used to normalize the feature value to a range from zero to one.

Borderness$_2$=2×(number_of_region_perimeter_pixels_on_image_border)/ (number_of_region_perimeter_pixels)

One of the semantic features is human skin. According a study of a photographic image database of over 2000 images, over 70% of the photographic images have people and about the same number of images have sizable faces in them. Thus, skin tones are common in images. Indeed, people are the single most important subject in photographs. Therefore, an algorithm that can effectively detect the presence of skin tones is useful in identifying the main subject of an image.

In the present invention, the skin detection algorithm utilizes color image segmentation and a pre-determined skin distribution in a specific chrominance space, as: P(skin|chrominance). It is known by those skilled in the art that the largest variation between different races is along the luminance direction, and the impact of illumination sources is also primarily in the luminance direction. Thus, if a given region falls within the defined chrominance space, the probabilities are that it is skin, regardless of the level of luminance. For reference see Lee, "Color image quantization based on physics and psychophysics," Journal of Society of Photographic Science and Technology of Japan, Vol. 59, No. 1, pp. 212–225, 1996, which is hereby incorporated by reference thereto. The skin region classification is based on maximum probability according to the average color of a segmented region, as to where it falls within the predefined chrominance space. However, the decision as to whether a region is skin or not is primarily a binary one. Utilizing a continuum of skin belief values contradicts, to some extent, the purpose of identifying skin and assigning a higher belief value. To counteract this issue, the skin probabilities are mapped to a belief output via a Sigmoid belief function, which serves as a "soft" thresholding operator. The Sigmoid belief function is understood by those skilled in the art.

Respecting the determination of whether a given region is a main subject or not, the task, is to determine the likelihood of a given region in the image being the main subject based on the posterior probability of:

P(main subject detection|feature)

In an illustrative embodiment of the present invention, there is one Bayes net active for each region in the image. Therefore, the probabilistic reasoning is performed on a per region basis (instead of per image).

In an illustrative embodiment, the output of main subject detection algorithm is a list of segmented regions ranked in descending order of the likelihood (or belief) that each is a main subject. This list can be readily converted into a belief map in which each region is located and is assigned a belief value proportional to the main subject belief of the region. Therefore, this map can be called a main subject belief map. Because of the continuum of belief values employed in the belief map, the belief map is more than a binary map that only indicates location of the determined main subject. The associated likelihood is also attached to each region so that the regions with large values correspond to regions with higher confidence, or belief, that it is part of the main subject.

To some extent, this belief map reflects the inherent uncertainty for humans to perform such a task as main subject detection because different observers would likely disagree on certain subject matter while agreeing on other subject matter in terms of which are main subjects. This illustrates a problem in binary main subject determinations. The subjective perception of each observer influences the apparent accuracy of the main subject detection algorithm. It is therefore impossible to detect the main subject exactly correctly because what is correct is held only in the opinion of each observer, which opinion varies from observer to observer. However, a binary decision, when desired, can be readily obtained by using an appropriate threshold on the belief map, where regions having belief values above the threshold are arbitrarily defined as main subjects and those below the threshold are arbitrarily defined as background regions.

In a preferred embodiment of the present invention, for determination of main subject emphasis, the main subject belief map having a continuum of belief values is utilized instead of a binary belief map. When a binary map is used, if a region from the main subject is wrongly classified as a part of the background region, it will be allocated very few bits, thereby introducing severe artifacts. Thus, the visual quality of the reconstructed image is very much dependent on the robustness of the main subject detection process. This is risky because it is very difficult to design a completely automated and robust system for main subject detection. Also, the determination of main subject can vary from observer to observer. In contrast, when using a main subject belief map with continuum of belief values, the emphasis placed on main subject, that is the process of allocating relatively higher number of bits to regions with high belief values, can be gradual. This has the advantage of avoiding making an irreversible decision that is visually objectionable to certain observers.

From the point of view of image compression, it is reasonable to assume that reconstruction errors in pixels having high belief values are more objectionable than errors of similar magnitudes in pixels with low belief values. This implies that distortion in regions with high belief values should be weighted more heavily. One way of accomplishing this is to vary the distortion-weighting factor $w_i(g,h)$ in Equation 3, based on the main subject belief map. One obvious difficulty is that the distortion-weighting factor $w_i(g,h)$ determines the visual weighting for a coefficient in the subband domain, whereas the main subject belief map is in the image domain. The distortion-weight calculation unit (112) derives the distortion-weighting factor $w_i(g,h)$ for each subband coefficient from the main subject belief map for the input image.

Previously, we described how to calculate the basis function corresponding to a specific subband coefficient. This basis function can be used to derive the distortion weighting for that subband coefficient. As before, let $\Psi_{gh}^i(u,v)$ denote the basis function corresponding to the subband coefficient $x_i(g,h)$ from subband i. Let the subband coefficient be quantized and let the reconstruction value be $\hat{x}_i(g,h)$. Then, the reconstructed value can be represented as the sum of the original coefficient and a quantization error $e_i(g,h)$, $$\hat{x}_i(g,h) = x_i(g,h) + e_i(g,h). \quad (4)$$

Since the synthesis operation is linear, the distortion in the reconstructed image due to the quantization error $e_i(g,h)$ in subband coefficient $x_i(j,k)$ is $$e(u,v) = e_i(g,h)\Psi_{gh}^i(u,v). \quad (5)$$

If we assume that the perceived distortion at a particular pixel location (u,v) is a function of the main subject belief value at that pixel location, the perceived distortion in the reconstructed image due to quantization of the subband coefficient $x_i(g,h)$ is $$\sum_{u,v} e^2(u,v)G(p(u,v)) \text{ or } e_i^2(g,h)\sum_{u,v}(\Psi_{gh}^i(u,v)^2)G(p(u,v)),$$

where p(u,v) denotes the main subject belief map value, G is a function of the belief value at that particular location, and the summation is over the support region for the basis function $\Psi_{gh}^i$. Thus, the distortion-weighting factor for subband coefficient $x_i(g,h)$ is $$w_i(g,h) = \sum_{u,v}(\Psi_{gh}^i(u,v))^2 G(p(u,v)). \quad (6)$$

Once the distortion-weight (113) for each subband coefficient has been calculated, the rate-distortion optimization algorithm, as described in Y. Shoham and A. Gersho, "Efficient bit allocation for an arbitrary set of quantizers," *IEEE Transactions on Acoustics, Speech, and Signal Processing,* 36(9), pp. 1445–1453, (September 1988) can be applied to determine the truncation point for each codeblock. Even if the input image is a color image (multi-component), only a single main subject belief map is computed and used to calculate the distortion-weights for each (possibly transformed) component image.

From Equation 6, it can be seen that to calculate the distortion-weighting factor for each coefficient, the summation term needs to be evaluated over the region of support of the basis function corresponding to that coefficient. For each level of decomposition, the region of support expands approximately by the length of the synthesis filter. Thus, the computational complexity for the calculation of distortion-weighting factors can grow very quickly. Some techniques to reduce the computational complexity are as follows.

Since the basis functions corresponding to different coefficients from the same band are shifted versions of each other, the basis function needs to be calculated exactly once for each subband. Furthermore, the square of the basis function, $(\Psi_{gh}^i(u,v))^2$, can be pre-calculated and stored. Also, the basis functions typically decay very rapidly away from the center of the region of support. This can be exploited by setting small values of $(\Psi_{gh}^i(u,v))^2$ to zero. This can save a significant amount of computations.

In another embodiment of the invention, for each subband coefficient, the region of support of the basis function corresponding to that coefficient is identified. Then, the average of all the belief values from the region of support is said to be the main subject belief value for that coefficient. The distortion-weight for the subband coefficient is a function of this average value. In a preferred embodiment, the distortion weight is set to the square of the average belief value. Those skilled in the art will recognize that other choices are possible. For example, a cubic function or a square-root function may be used. The function chosen affects the emphasis placed on the main subject region. In another embodiment of the invention the main subject belief value for a subband coefficient is set to the median (or a fixed percentile) of the belief values from the region of support of the basis function corresponding to that coefficient. As described before, the distortion-weight for the subband coefficient is then a function of the median value.

In another embodiment, a single distortion-weighting factor is calculated for each codeblock. This is accomplished as follows. First the region of support for each subband coefficient in the codeblock is determined. Then, the region of support for the codeblock, which is defined to be the union of the regions of support of all the subbands coefficients belonging to that codeblock, is determined. The main subject belief value for the entire codeblock is set equal to the average of the main subject belief values from the region of support for that codeblock. The distortion-weighting factor for the codeblock is set to a function of the main subject belief value. As discussed before, instead of calculating the average, a median or a certain percentile value may be calculated. Similarly, the function is chosen to be the square of the average belief value for that codeblock; but other choices such as a square-root or cubic are also possible.

It may also be desirable to apply pre-filtering to the original image before the JPEG 2000 compression. Because the background region will be encoded at a lower bit rate, a typical compression artifact seen in the background regions is blotchiness. The background does not appear to have a uniform lower image quality, with occasional sharp structures among largely smooth background regions in the compressed image. It is possible to pre-smooth the image to make the degradation in the background region more graceful. In a preferred embodiment, this can be accomplished as follows. Each pixel in the original image is filtered with a spatially varying low-pass filter. The cut-off frequency of the low-pass filter depends on the main subject belief value. If the belief value is 1.0, the filter is an all-pass filter, whereas if the belief value is near 0, the filter has a large spatial extent and very low cut-off frequency. The benefit of pre-smoothing are additional saving in bits spent in compressing the background regions, and more uniform appearance of the background.

Figure 7:
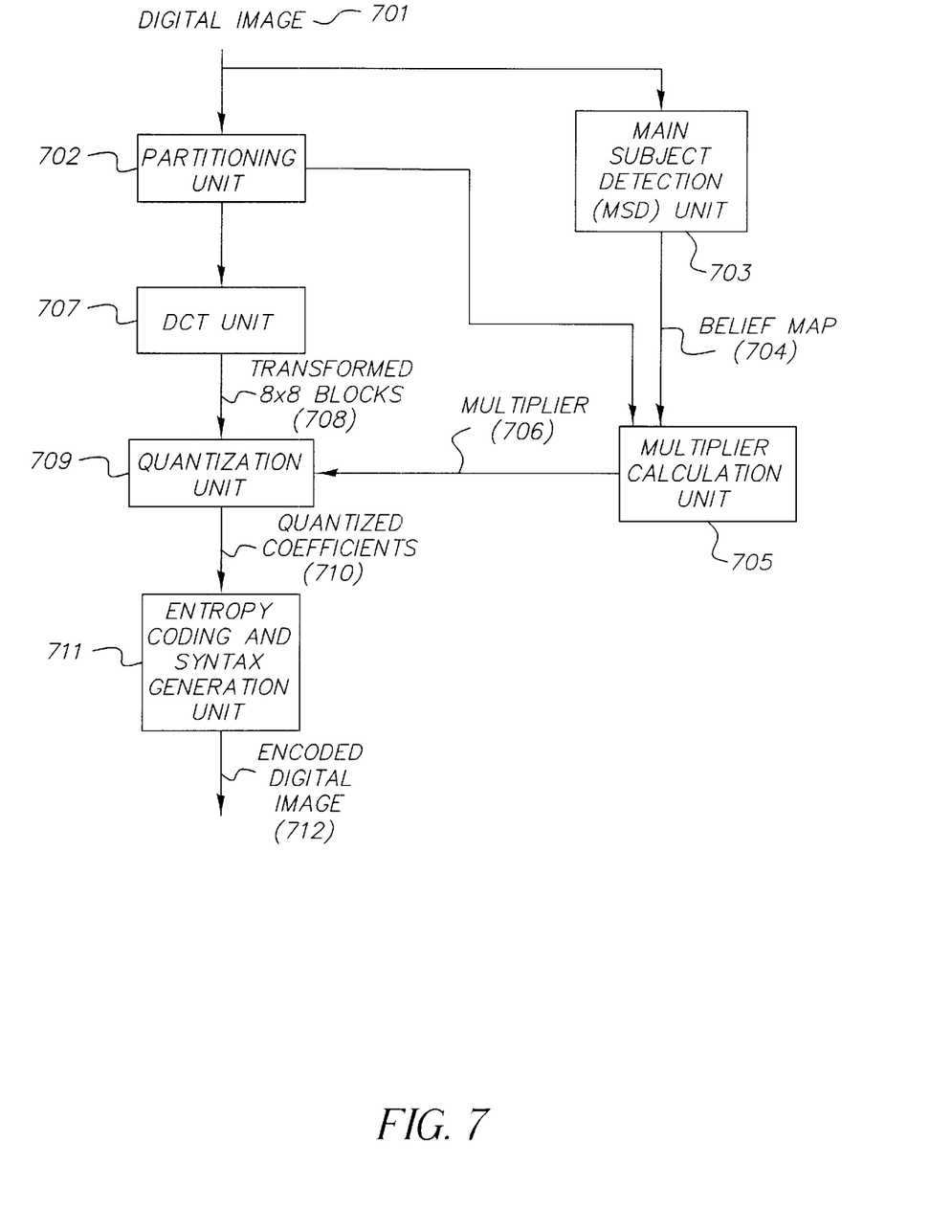
FIG. 7 shows a block diagram of an encoder based on the JPEG extension utilizing a main subject belief map.

As mentioned previously, the present invention can be applied to other compression systems. For example, in the encoder, the wavelet or subband decomposition may be substituted with any other space-frequency decomposition that provides some degree of spatial locality. It can also be applied to a block-based coder such as a transform coder. FIG. 7 shows a transform coder based on an extension to the JPEG standard as described in ISO/IEC International Standard 10918-3, the contents of which are hereby incorporated by reference thereto. The coder uses the main subject belief map for spatially adaptive quantization. The extension to the JPEG standard allows specification of a quantizer matrix for each image component as described in W. B. Pennebaker and Joan L. Mitchell, *JPEG Still Image Data Compression Standard*, Van Nostrand Reinhold, New York 1993. In addition, for each 8×8 block, the extension allows the specification of a multiplier, which scales the quantization matrix. In another embodiment of the invention, the multiplier for each 8×8 block is varied depending on the average of the main subject belief value for the block as shown in FIG. 7.

Referring to FIG. 7 in greater detail, a digital image (701) is partitioned into 8×8 blocks by the partitioning unit (702). The digital image is also input to a main subject detection unit (703). The MSD unit (703) produces a belief map (704) of main subject belief values for the image. The belief map (704) is fed to a multiplier calculation unit (705), which calculates the average of the main subject belief values for each 8×8 block and uses the average value to determine the multiplier (706) for that 8×8 block. The JPEG-extension allows two pre-specified tables for multiplier values (linear or non-linear). In a preferred embodiment, the linear table is used. For the linear table, the entries range from ($1/16$) to ($31/16$) in increments of ($1/16$). Since the average of belief values for an 8×8 block is between 0 and 1, in a preferred embodiment, the multiplier is determined as $$\text{multiplier} = \frac{\lfloor (1.0 - \text{average}) \times 32.0 \rfloor}{16}$$

where average represents the average belief value for the 8×8 block and $\lfloor x \rfloor$ represents the greatest integer less than or equal to x. The resulting multiplier value is clipped to the range [$1/16$, $31/16$]. As expected, the multipliers for the blocks with lower average belief values are higher, resulting in coarser quantization. Those skilled in the art will recognize that it is possible to use any other mapping as long as lower average belief values get mapped to higher multiplication factors. The DCT unit (707) transforms each 8×8 block using two-dimensional discrete cosine transform (2-D DCT) to produce transformed 8×8 blocks (708). The quantization unit (709) quantizes the DCT coefficients using the appropriate quantization matrix and the multiplier (706) supplied by the multiplier calculation unit (705) to produce quantized coefficients (710). Then, the entropy coding and syntax generation unit (711) generates a compressed bit-stream (712) that is compatible with the extension to the JPEG standard.

In the previous example, the bit-stream syntax for the JPEG-extension has provision for varying the multiplier for each 8×8 block. Those skilled in the art will realize that if a different block-based coder is being used, the change in the extent of quantization for each block, based on main subject belief map, may be conveyed to the decoder in the form of side information. As an example, consider a block-based coder that uses vector quantization to encode each block. The size of the vector quantizer codebook may be varied based on the average of the main subject belief values for that block. This information is conveyed to the decoder as side information so that the decoder can decode the quantizer indices using the codebook having the appropriate size.

The subject matter of the present invention relates to digital image understanding technology, which is understood to mean technology that digitally processes a digital image to recognize and thereby assign useful meaning to human understandable objects, attributes or conditions and then to utilize the results obtained in the further processing of the digital image.

Further modification and variation can be made to the disclosed embodiments without departing from the subject and spirit of the invention as defined in the following claims. Such modifications and variations, as included within the scope of these claims, are meant to be considered part of the invention as described.

| PARTS LIST | |
|---|---|
| 101 | digital image |
| 102 | subband decomposition |
| 103 | subband coefficients |
| 104 | codeblock partitioning unit |
| 105 | codeblock |
| 106 | codeblock compression unit |
| 107 | compressed codeblock bit-stream |
| 108 | byte-count table |
| 109 | bit budget |
| 110 | main subject detection (MSD) unit |
| 111 | belief map |
| 112 | distortion-weight calculation unit |
| 113 | distortion weights |
| 114 | rate-control unit and bit stream organizer |
| 115 | encoded digital image |
| 401 | scalar quantizer |

-continued

PARTS LIST

| | |
|---|---|
| 402 | quantized coefficients |
| 403 | entropy encoder |
| 404 | table generation unit |
| 405 | quantizer step-sizes |
| 601 | image segmentation unit |
| 602 | feature extraction unit |
| 603 | belief computation unit |
| 701 | digital image |
| 702 | partitioning unit |
| 703 | MSD unit |
| 704 | belief map |
| 705 | multiplier calculation unit |
| 706 | multiplier |
| 707 | DCT unit |
| 708 | transformed 8 × 8 blocks |
| 709 | quantizer unit |
| 710 | quantizer coefficients |
| 711 | syntax generation unit |
| 712 | encoded digital image |

What is claimed is:

1. A method for producing a compressed bit-stream from a digital image, comprising the steps of:
   a) processing the digital image to produce a main subject belief map containing a continuum of belief values relating to the importance of subject and background regions in the image;
   b) performing a spatio-frequency transformation on the digital image to produce an array of transform coefficients;
   c) deriving a distortion-weighting factor for each transform coefficient from the belief map; and
   d) producing a compressed bit stream using an image compression system that is responsive to the distortion-weighting factors.

2. The method as claimed in claim 1 wherein the image compression system in step d) produces a compressed bit stream not exceeding a target size, using the distortion-weighting factors to minimize an error function.

3. The method as claimed in claim 1 wherein the image compression system is JPEG compression.

4. The method as claimed in claim 1 wherein the image compression system is JPEG2000 compression.

5. The method as claimed in claim 1 wherein the image compression system is vector quantization, and the spatio-frequency transformation is an identity transform.

6. The method as claimed in claim 1 wherein producing a main subject belief map in step a) comprises the steps of:
   a1) extracting regions of homogeneous properties from the digital image;
   a2) extracting for each of the regions at least one structural saliency feature and at least one semantic saliency feature; and,
   a3) integrating the structural saliency feature and the semantic feature using a probabilistic reasoning engine into an estimate of a belief that each region is the main subject.

7. The method as in claim 6, wherein step a2) uses centrality as the structural saliency feature.

8. The method as in claim 6, wherein step a2) uses borderness as the structural saliency feature.

9. The method as in claim 6, wherein step a2) uses a presence of skin tones as the semantic saliency feature.

10. The method as in claim 6 wherein step a3) uses a Bayes net as the reasoning engine.

11. A computer storage medium having instructions stored therein for causing a computer to perform the method of claim 1.

12. A method for producing a compressed bit-stream from a digital image, comprising the steps of:
   a) processing the digital image to produce a main subject belief map containing a continuum of belief values relating to the importance of subject and background regions in the image;
   b) performing subband decomposition on the digital image using analysis filters to produce an array of subband coefficients that can be used to reconstruct the digital image by summing corresponding synthesis basis functions weighted by the subband coefficients;
   c) deriving a distortion-weighting factor from the belief map for each subband coefficient; and
   d) producing a compressed bit stream not exceeding a target size from the subband coefficients using the distortion-weighting factors to minimize an error function.

13. The method claimed in claim 12, wherein the step c) of deriving a distortion-weighting factor comprises the steps of:
   c1) for a subband coefficient, identifying a region of support in the belief map corresponding to the subband coefficient; and
   c2) calculating a distortion-weighting factor for the subband coefficient using belief values in the identified region of support.

14. The method claimed in claim 13, wherein the region of support is centered at the corresponding spatial location of the subband coefficient and has a size corresponding to the spatial extent of the corresponding synthesis basis function.

15. The method claimed in claim 14, wherein the subband decomposition is wavelet decomposition.

16. The method claimed in claim 12, wherein the compressed bit stream is produced by quantization and entropy encoding.

17. The method claimed in claim 16, wherein the compressed bit stream is a JPEG 2000 Part I compliant bit stream.

18. The method claimed in claim 12, wherein the error function is a mean square error function weighted by the distortion-weighting factors.

19. The method claimed in claim 13, wherein the step c2) of calculating a distortion-weighting factor for the subband coefficient is performed by averaging the belief values in the region of support and calculating the distortion-weighting factor as a function of the average belief value.

20. The method claimed in claim 19, wherein the function is a power function.

21. The method claimed in claim 13, wherein the step c2) of calculating a distortion-weighting factor for the subband coefficient is performed by rank ordering the belief values in the region of support and selecting the belief value at a predetermined rank to calculate the distortion-weighting factor as a function of the selected belief value.

22. The method claimed in claim 21, wherein the function is a power function.

23. The method claimed in claim 12, further comprising the step of processing the digital image to reduce the amount of high frequency content in the background regions according to the main subject belief map prior to performing subband decomposition.

24. The method claimed in claim 23, wherein the step c) of deriving a distortion-weighting factor comprises the steps of:

c1) for a subband coefficient identifying a region of support in the belief map corresponding to the subband coefficient; and c2) calculating a distortion-weighting factor for the subband coefficient using belief values in the identified region of support.

25. The method claimed in claim 24, wherein the region of support is centered at the corresponding spatial location of the subband coefficient and has a size corresponding to the spatial extent of the corresponding synthesis basis function.

26. The method claimed in claim 25, wherein the subband decomposition is wavelet decomposition.

27. The method claimed in claim 23, wherein the compressed bit stream is produced by quantization and entropy encoding.

28. The method claimed in claim 27, wherein the compressed bit stream is a JPEG 2000 compliant bit stream.

29. The method claimed in claim 23, wherein the error function is a mean square error function weighted by the distortion-weighting factors.

30. The method claimed in claim 24, wherein the step c2) of calculating a distortion-weighting factor for the subband coefficient is performed by averaging the belief values in the region of support and calculating the distortion-weighting factor as function of the average belief value.

31. The method claimed in claim 30, wherein the function is a power function.

32. The method claimed in claim 24, wherein the step c2) of calculating a distortion-weighting factor for the subband coefficient is performed by rank ordering the belief values in the region of support and selecting the belief value at a predetermined rank to calculate the distortion-weighting factor as function of the selected belief value.

33. The method claimed in claim 32, wherein the function is a power function.

34. The method claimed in claim 23, wherein the step of processing the digital image to reduce the amount of high frequency content includes low pass filtering the digital image and varying the bandwidth of the low pass filter spatially in proportion to the belief values in the belief map.

35. The method as claimed in claim 12 wherein producing a main subject belief map in step a) comprises the steps of:

a1) extracting regions of homogeneous properties from the digital image;

a2) extracting for each of the regions at least one structural saliency feature and at least one semantic saliency feature; and, a3) integrating the structural saliency feature and the semantic feature using a probabilistic reasoning engine into an estimate of a belief that each region is the main subject.

36. The method as in claim 35, wherein step a2) uses centrality as the structural saliency feature.

37. The method as in claim 35, wherein step a2) uses borderness as the structural saliency feature.

38. The method as in claim 35, wherein step a2) uses a presence of skin tones as the semantic saliency feature.

39. The method as in claim 35 wherein step a3) uses a Bayes net as the reasoning engine.

40. A computer storage medium having instructions stored therein for causing a computer to perform the method of claim 12.

* * * * *